(12) United States Patent
Pan et al.

(10) Patent No.: US 11,345,346 B2
(45) Date of Patent: May 31, 2022

(54) METHOD FOR VEHICLE FOLLOWING CONTROL BASED ON REAL-TIME CALCULATION OF DYNAMIC SAFE FOLLOWING DISTANCE

(71) Applicant: TONGJI UNIVERSITY, Shanghai (CN)

(72) Inventors: Deng Pan, Shanghai (CN); Yijun Xia, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 139 days.

(21) Appl. No.: 17/026,228

(22) Filed: Sep. 20, 2020

(65) Prior Publication Data
US 2021/0001851 A1 Jan. 7, 2021

Related U.S. Application Data

(63) Continuation of application No. PCT/CN2019/092747, filed on Jun. 25, 2019.

(30) Foreign Application Priority Data

Jul. 6, 2018 (CN) .......................... 201810738658.0

(51) Int. Cl.
*B60W 30/165* (2020.01)
*B60W 10/18* (2012.01)
(Continued)

(52) U.S. Cl.
CPC .......... *B60W 30/165* (2013.01); *B60W 10/18* (2013.01); *B60W 40/105* (2013.01);
(Continued)

(58) Field of Classification Search
CPC .. B60W 30/165; B60W 10/18; B60W 40/105; B60W 2554/404; B60W 2556/65; G08G 1/22; H04W 4/46
See application file for complete search history.

(56) References Cited

U.S. PATENT DOCUMENTS

| | | | | |
|---|---|---|---|---|
| 6,389,351 B1 * | 5/2002 | Egawa | ............... | B60K 31/0008 |
| | | | | 701/96 |
| 6,430,494 B1 * | 8/2002 | Inoue | ................. | B60K 31/0008 |
| | | | | 701/96 |

(Continued)

FOREIGN PATENT DOCUMENTS

| | | |
|---|---|---|
| CN | 102955884 A | 3/2013 |
| CN | 103101559 A | 5/2013 |
| CN | 103136451 A | 6/2013 |

*Primary Examiner* — Peter D Nolan
*Assistant Examiner* — Wae L Louie (57) ABSTRACT

A method for vehicle following control based on the real-time calculation of dynamic safe following distance. A preset vehicle deceleration model with three preset behavior adjustment parameters is used to obtain the absolute braking distance models of the leading and following vehicles, then to further establish the dynamic safe following distance model for calculating the dynamic safe following distance between the following vehicle and the leading vehicle in real time. In the process of vehicle following operation, the current dynamic safe following distance is compared with the current actual following distance to determine whether to adjust the following behavior of the following vehicle and how to control the following vehicle to move in safety, efficiency and smoothness.

5 Claims, 2 Drawing Sheets

(51) Int. Cl.
*B60W 40/105* (2012.01)
*B60W 40/107* (2012.01)
*G05B 17/02* (2006.01)
*G08G 1/00* (2006.01)
*H04W 4/46* (2018.01)

(52) U.S. Cl.
CPC ........... *B60W 40/107* (2013.01); *G05B 17/02* (2013.01); *G08G 1/22* (2013.01); *B60W 2554/404* (2020.02); *B60W 2556/65* (2020.02); *H04W 4/46* (2018.02)

(56) References Cited

U.S. PATENT DOCUMENTS

| | | | |
|---|---|---|---|
| 2008/0319610 A1* | 12/2008 | Oechsle | B60W 30/08 340/436 |
| 2009/0062987 A1* | 3/2009 | Kim | B60W 30/09 701/41 |
| 2012/0101680 A1* | 4/2012 | Trepagnier | G01S 17/86 701/25 |
| 2012/0139330 A1* | 6/2012 | Morishita | B60T 13/586 303/3 |
| 2018/0038952 A1* | 2/2018 | Shokonji | G01S 17/86 |
| 2020/0001871 A1* | 1/2020 | Wang | B60W 30/16 |
| 2020/0122759 A1* | 4/2020 | Zhuo | B61L 27/20 |
| 2021/0001851 A1* | 1/2021 | Pan | B60W 40/105 |
| 2021/0114591 A1* | 4/2021 | Kamiya | B60W 30/09 |
| 2022/0009488 A1* | 1/2022 | Li | B60W 10/18 |

* cited by examiner

METHOD FOR VEHICLE FOLLOWING CONTROL BASED ON REAL-TIME CALCULATION OF DYNAMIC SAFE FOLLOWING DISTANCE

CROSS-REFERENCE TO RELATED APPLICATIONS

This application is a continuation of International Patent Application No. PCT/CN2019/092747 with a filing date of Jun. 25, 2019, which claims the benefit of priority from Chinese Patent Application No. 201810738658.0 with a filing date of Jul. 6, 2018. The content of the aforementioned applications, including any intervening amendments thereto, is incorporated herein by reference.

TECHNICAL FIELD

The present application relates to traffic engineering, and more particularly to a method for vehicle following control based on real-time calculation of dynamic safe following distance.

BACKGROUND

In the situation in which one vehicle is following another vehicle, there is always an optimal following distance between the leading vehicle and the following vehicle, called a dynamic safe following distance that corresponds to real-time following situations, enabling safe, efficient, smooth and rapid behavior adjustment of the following vehicle. Clearly, the dynamic safe following distance is not constant and varies with the following situations. The dynamic safe following distance is of great significance for ensuring a safe and efficient following operation and steady vehicle behavior adjustment during the real-time following control. Therefore, the dynamic safe following distance not only serves as basic data for high-quality vehicle following control, but also provides important indicators for the traffic administration department to scientifically manage the traffic flow in the road network.

It is not difficult to see that the current following state and behavior quality of the following vehicle can be evaluated by comparing the dynamic safe following distance with the actual following distance in real time, to support the scientific behavior adjustment of the following vehicle. Therefore, the dynamic safe following distance plays an extremely important role in the safe, efficient and steady vehicle following operation at any time. Since the velocities of the leading and following vehicles are very different and change in real time, the control strategies of the leading and following vehicles need to be determined in real time according to the specific following situation, which brings great difficulty and complexity in the scientific and real-time calculation of the dynamic safe following distance. The dynamic safe following distance also applies in highway and rail systems for the adjustment of following behaviors under arbitrary following situations in full velocity domain. However, there is still no such a widely-recognized standard for the calculation of the dynamic safe following distance in the transportation field. Although a few of "safe following distance" standards at several typical velocities have been proposed for train following operation, they cannot satisfy the control requirements of trains for safe and efficient operations under various following situations. Therefore, there is an urgent need for the calculation of the dynamic safe following distance in the rail transit field.

At present, the dynamic safe following distance is calculated mainly through fitting functions in the academic and engineering circles, but reports on it application in the transportation industry are not found. The dynamic safe following distance is always changing with the following situations, involving multiple parameters such as velocity and control strategy. Further, each parameter has an infinite number of values, so the combinations of those parameters are too many to count, which renders the calibration of the dynamic safe following distance extremely complex. Therefore, considerable engineering experiments are needed for establishing an accurate dynamic safe following distance model, which will cause a large consumption of manpower and financial resources. Moreover, a limited number of experiments fail to ensure the accuracy of the dynamic safe following distance model. It has been reported that the hyperbolic function model may be established to study the dynamic safe following distance and vehicle behavior control, but this method generally involves excessive intermediate parameters and relatively complicated solving process, which leads to a low calculation efficiency, failing to achieve the real-time control of the vehicle following behavior.

SUMMARY

An object of the disclosure is to provide a method for vehicle following control based on real-time calculation of dynamic safe following distance, in which the safety, efficiency and smoothness of the following vehicle in adjusting its behavior are taken into full consideration and are closely integrated into the real-time tracking control of the dynamic safe following distance. Compared with the methods of establishing the dynamic safe following distance model completely based on engineering experimental data, the method provided herein not only reduces the complexity of modeling and improves the modeling efficiency, but also can help the following vehicle adjust its behavior smoothly and quickly, and travel in safety and efficiency.

The technical solutions of the disclosure are described as follows.

In a first aspect, the disclosure provides a method for vehicle following control based on real-time calculation of dynamic safe following distance, comprising:

(1) establishing a dynamic safe following distance model for vehicle following control; wherein the dynamic safe following distance model is established through steps of:

(1.1) according to a preset control requirement of a vehicle braking from an initial velocity until it stops completely, obtaining a first preset behavior adjustment parameter and a second preset behavior adjustment parameter according to equation (1):

$$\begin{cases} \max(|a|) = k\left(\dfrac{v_0}{2} + \delta\right) \\ \max\left(\left|\dfrac{da}{dt}\right|\right) = \dfrac{4}{9}k^2\left(\dfrac{v_0}{2} + \delta\right) \end{cases} \quad (1)$$

wherein $v_0$ is an initial velocity when the vehicle starts to brake and decelerate; k is the first preset behavior adjustment parameter; $\delta$ is the second preset behavior adjustment parameter; a is an acceleration of the vehicle; max( ) is a function that returns a maximum value; and max(|a|) and $$\max\left(\left|\dfrac{da}{dt}\right|\right)$$

reflect control requirements for the vehicle to brake smoothly and rapidly;

(1.2) calculating a third preset behavior adjustment parameter by substituting values of the first preset behavior adjustment parameter and the second preset behavior adjustment parameter into a preset vehicle deceleration model; the preset vehicle deceleration model is expressed by equation (2):

$$v(t) = -\left(\frac{v_0}{2} + \delta\right)\tanh(k(t-\tau)) + \frac{v_0}{2}; \quad (2)$$

wherein t is a time variable; v(t) is a time-variable velocity function and $v(t)|_{t=-\infty}=v_0+\delta$, $v(t)|_{t=\infty}=-\delta$; tan h( ) is a hyperbolic tangent function; and $\tau$ is the third preset behavior adjustment parameter;

(1.3) calculating and determining an absolute braking distance of the vehicle travelling from a time it starts to brake at the initial velocity $v_0$ to another time it stops completely by substituting the values of the above three preset parameters k, $\delta$, and $\tau$ into equation (2) and performing the time integration of equation (2);

(1.4) obtaining a plurality of absolute braking distances respectively corresponding to different values of the initial velocity $v_0$ by performing the above steps from (1.1) to (1.3); and establishing a curve fitting function of the absolute braking distance changing with the initial velocity by using a numerical analysis method; the curve fitting function established above is the absolute braking distance model of the vehicle;

(1.5) obtaining an absolute braking distance model of a leading vehicle and an absolute braking distance model of the following vehicle by performing the above steps from (1.1) to (1.4) according to the different preset control requirements of the leading vehicle and the following vehicle; then further establishing the dynamic safe following distance model for vehicle following control;

during every sampling period, the dynamic safe following distance model is used to evaluate the current following situation, so that the corresponding control can be taken by the following vehicle to adjust its behavior in safety, smoothness, efficiency, the steps comprise:

(2) obtaining a current braking mode information of the following vehicle in real time during its following operation;

(3) obtaining a current velocity of the leading vehicle and a current velocity of the following vehicle in real time; calculating a current dynamic safe following distance at the present moment between the following vehicle and the leading vehicle using the dynamic safe following distance model according to a current preset control requirement of the following vehicle, the current braking mode information of the following vehicle, the current velocity of the leading vehicle, and the current velocity of the following vehicle; and (4) comparing, by a controller, the current dynamic safe following distance with a current actual following distance to determine whether it is required to adjust a current following behavior of the following vehicle;

if it is required to adjust the current following behavior of the following vehicle, controlling the following vehicle to adjust its behavior until the actual following distance equals to the dynamic safe following distance during a certain future sampling period, thereby achieving the real-time tracking of the dynamic safe following distance; otherwise, maintaining the current actual following distance by the following vehicle under control, which can only happen in the safe and efficient stead-following state under which no velocity difference exists between the leading vehicle and the following vehicle, and the current dynamic safe following distance is equal to the current actual following distance.

In an embodiment, in step (3), the dynamic safe following distance model established in step (1.5) is used to calculate in real time the current dynamic safe following distance between the following vehicle and the leading vehicle. The dynamic safe following distance model is described as follows:

$$S(v^f(t),v^p(t))=g_f(v^f(t))-cg_p(v^p(t))+\Delta s \quad (3);$$

wherein $S(v^f(t),v^p(t))$ is a function which can be used to calculate in real time the current safe following distance between the following vehicle and the leading vehicle under the current preset control requirement; $v^f(t)$ is the current velocity of the following vehicle; $v^p(t)$ is the current velocity of the leading vehicle; $g_f(v^f(t))$ is an absolute braking distance model of the following vehicle when it starts to brake at an initial velocity $v^f(t)$; $g_p(v^p(t))$ is the absolute braking distance model of the leading vehicle when it starts to brake at an initial velocity $v^p(t)$; $\Delta s$ is a distance margin designed for eliminating calculation error to keep the following vehicle always in a safe following state after considering the time delay of the following vehicle adjusting its behavior in response to the behavior change of the leading vehicle; c is a parameter of the braking mode information, wherein c=0 indicates that the following vehicle adopts an absolute braking mode; c=1 indicates that the following vehicle adopts a relative braking mode.

In an embodiment, in step (1.3), the absolute braking distance of the vehicle travelling from the time it starts to brake at the initial velocity $v_0$ to another time it stops completely is obtained through the time integration of equation (2), as shown in equation (4):

$$S_B=\int_0^{2\tau}v(t)dt \quad (4);$$

wherein $S_B$ is an absolute braking distance when the vehicle starts to brake at the initial velocity $v_0$; v(t) is the time-variable velocity function; and $\tau$ is the third preset behavior adjustment parameter.

In step (1.4), the curve fitting function is established by using the numerical analysis method to reflect a mapping relationship between values of absolute braking distances $S_B$ and different initial velocity $v_0$; the curve fitting function established above is an absolute braking distance model of the vehicle, which is further used to construct the dynamic safe following distance model.

Specifically, due to that the preset control requirements of the leading vehicle and the following vehicle are different from each other (as described in step (1.5)), the curve fitting functions (or the absolute braking distance models) respectively established for the leading vehicle and the following vehicle are also different from each other, as shown in equation (3), $g_f(v^f(t))$ is the absolute braking distance model of the following vehicle when it starts to brake at an initial velocity $v^f(t)$; $g_p(v^p(t))$ is the absolute braking distance model of the leading vehicle when it starts to brake at an initial velocity $v^p(t)$. In a second aspect, the present disclosure provides a vehicular electronic system where the dynamic safe following distance model is used to calculate the current safe following distance in real time for evaluating the current following situation, and the control method based on dynamic safe following distance is implemented for the following vehicle to move in safety, smoothness, and efficiency. The vehicular electronic system comprises:

two on-board speed sensors respectively installed on a leading vehicle and a following vehicle;

two vehicle positioning devices respectively installed on the leading vehicle and the following vehicle;

two wireless communication devices respectively installed on the leading vehicle and the following vehicle;

one inter-vehicle distance measuring instrument installed on the following vehicle;

at least one processor and a memory connected to the at least one processor, all installed on the following vehicle;

at least one external instruction can be received by the vehicular electronic system after initialization and executed by the at least one processor to perform any one of the above mentioned methods.

The third technical solutions of the disclosure are described as follows.

The present disclosure provides a non-transitory computer-readable storage medium having stored thereon at least one program, wherein the at least one program is called by at least one processor through executing at least one external instruction, to perform any one of the above mentioned methods.

Compared to the prior art, the method described in the disclosure has the following distinct characteristics and beneficial effects.

In the method for vehicle following control, a preset vehicle deceleration model with three preset behavior adjustment parameters is introduced to determine the dynamic safe following distance model provided herein for the real-time calculation of dynamic safe following distance. Compared with the traditional modeling methods of dynamic safe following distance model completely based on engineering experimental data, the method described in the present disclosure reduces the modeling complexity and improves the modeling efficiency.

The braking mode taken by the following vehicle at the present moment is considered in the dynamic safe following distance model, which thereby provides an extensive suitability in calculating in real time the current safe following distance between the leading vehicle and the following vehicle for vehicle following control under complex following situations.

The current safe following distance is compared with a current actual following distance by a controller to determine whether to adjust the current following behavior of the following vehicle; if it is required to adjust the current following behavior of the following vehicle, the following vehicle would be controlled to adjust its behavior to track the dynamic safe following distance in real time, thereby integrating the safety, rapidity and smoothness requirements of vehicle following behavior adjustments into the real-time control of the dynamic safe following distance.

The method for vehicle following control can provide a reference for safe and efficient vehicle following control, which is especially suitable for the following control of intelligent vehicles in highway or motorway and intelligent trains under moving block systems in rail transit field. Moreover, the method can also be used as a standard for traffic administration, autonomous driving, and the manufacturing of future intelligent vehicles and trains, can provide a scientific reference for the traffic administration department and the vehicle manufacturing industry to formulate the performance and behavior criteria of future vehicles and trains, and can be first tested and promoted in the rail transit field.

DETAILED DESCRIPTION OF EMBODIMENTS

The present disclosure will be further described in detail below with reference to the accompanying drawings and embodiments.

The present disclosure provides a method for vehicle following control based on real-time calculation of dynamic safe following distance, which is specifically described as follows.

(1) A dynamic safe following distance model is established as follows.

(1.1) According to a preset control requirement of a vehicle braking from an initial velocity until it stops completely, a first preset behavior adjustment parameter and a second preset behavior adjustment parameter are obtained according to equation (1):

$$\begin{cases} \max(|a|) = k\left(\frac{v_0}{2} + \delta\right) \\ \max\left(\left|\frac{da}{dt}\right|\right) = \frac{4}{9}k^2\left(\frac{v_0}{2} + \delta\right) \end{cases} \quad (1)$$

where $v_0$ is an initial velocity when the vehicle starts to brake and decelerate; k is the first preset behavior adjustment parameter; $\delta$ is the second preset behavior adjustment parameter; a is an acceleration of the vehicle; max( ) is a function that returns a maximum value; and max(|a|) and $$\max\left(\left|\frac{da}{dt}\right|\right)$$

reflect the control requirements for the vehicle to brake smoothly and rapidly.

(1.2) A third preset behavior adjustment parameter is calculated by substituting the values of the first preset behavior adjustment parameter and the second preset behavior adjustment parameter into a preset vehicle deceleration model. The preset vehicle deceleration model is expressed by equation (2):

$$v(t) = -\left(\frac{v_0}{2} + \delta\right)\tanh(k(t - \tau)) + \frac{v_0}{2}; \quad (2)$$

where t is a time variable; v(t) is a time-variable velocity function and $v(t)|_{t=-\infty} = v_0 + \delta$, $v(t)|_{t=\infty} = -\delta$; tan h( ) is a hyperbolic tangent function; and $\tau$ is the third preset behavior adjustment parameter.

(1.3) The absolute braking distance of the vehicle traveling from a time it starts to brake at the initial velocity $v_0$ to another time it stops completely by substituting the values of the above three preset parameters k, δ, and τ into equation (2) and performing the time integration of equation (2).

(1.4) A plurality of absolute braking distances $S_B$ corresponding to different values of the initial velocity $v_0$ are respectively obtained by performing the above steps from (1.1) to (1.3), and a curve fitting function of the absolute braking distance changing with the initial velocity is established using a numerical analysis method, the curve fitting function established above is exactly the absolute braking distance model of the vehicle.

In an embodiment, in step (1.3), the absolute braking distance of the vehicle travelling from the time it starts to brake at the initial velocity $v_0$ to another time it stops completely is obtained through the time integration of equation (2), as shown in the following equation (4):

$$S_B = \int_0^{2\tau} v(t) dt \quad (4);$$

where $S_B$ is the absolute braking distance when the vehicle starts to brake at the initial velocity $v_0$; $v(t)$ is the time-variable velocity function; and τ is the third preset behavior adjustment parameter.

According to the absolute braking distances calculated by equation (4) at any initial velocity, a curve fitting function of the absolute braking distance changing with the initial velocity is further established as follows:

$$S_B = g(v_0) \quad (5);$$

where $g(v_0)$ is the curve fitting function of the absolute braking distance $S_B$ changing with the initial velocity $v_0$.

The dynamic safe following distance is closely related to the braking distances of the leading vehicle and the following vehicle. When determining the dynamic safe following distance, the preset control requirements needed to be satisfied respectively by the leading vehicle and the following vehicle are as follows:

i) the requirements of smoothness and rapidity for the following vehicle under common braking, the requirement of safety for the following vehicle to avoid crash with the leading vehicle, and the requirement of vehicle following efficiency improvement for vehicle density increase; and ii) the requirement of safety when the leading vehicle stops in an emergency.

In the above two situations, max(|a|) and $$\max\left(\left|\frac{da}{dt}\right|\right)$$

both have a unique value to satisfy the control requirements of vehicular behavior adjustment.

According to the preset control requirements that the leading vehicle and the following vehicle need to satisfy during the parking brake, and the above mentioned method for establishing the absolute braking distance model of the vehicle, the absolute braking distance model of the leading vehicle and the absolute braking distance model of the following vehicle at any moment can be obtained in form of equation (5); then respectively through argument substitution, the absolute braking distance model of the leading vehicle is expressed as $S_B^p = g_p(v^p(t))$, and the absolute braking distance model of the following vehicle is expressed as $S_B^f = g_f(v^f(t))$, where $v^f(t)$ is the current velocity of the following vehicle; $v^p(t)$ is the current velocity of the leading vehicle; $g_f(v^f(t))$ is the absolute braking distance model of the following vehicle when it starts to brake at an initial velocity $v^f(t)$; $g_p(v^p(t))$ is the absolute braking distance model of the leading vehicle when it starts to brake at an initial velocity $v^p(t)$.

Specifically, the deriving process of equation (1) is described as follows.

a) In an actual application process, according to the control requirements for passenger and cargo transportation during vehicular braking process, a preset vehicle deceleration model that reflects the smoothness and rapidity of vehicular behavior adjustment is established below:

$$v(t) = -\left(\frac{v_0}{2} + \delta\right)\tanh(k(t-\tau)) + \frac{v_0}{2}; \quad (2)$$

where $v_0$ is the initial velocity when the vehicle starts to brake; k is the first preset behavior adjustment parameter; δ is the second preset behavior adjustment parameter; k and τ are greater than 0; δ is a small velocity increment greater than 0; t is the time variable; $v(t)$ is a time-variable velocity function and $v(t)|_{t=-\infty} = v_0 + \delta$, $v(t)|_{t=\infty} = -5$; and tan h( ) is the hyperbolic tangent function.

Figure 1A:
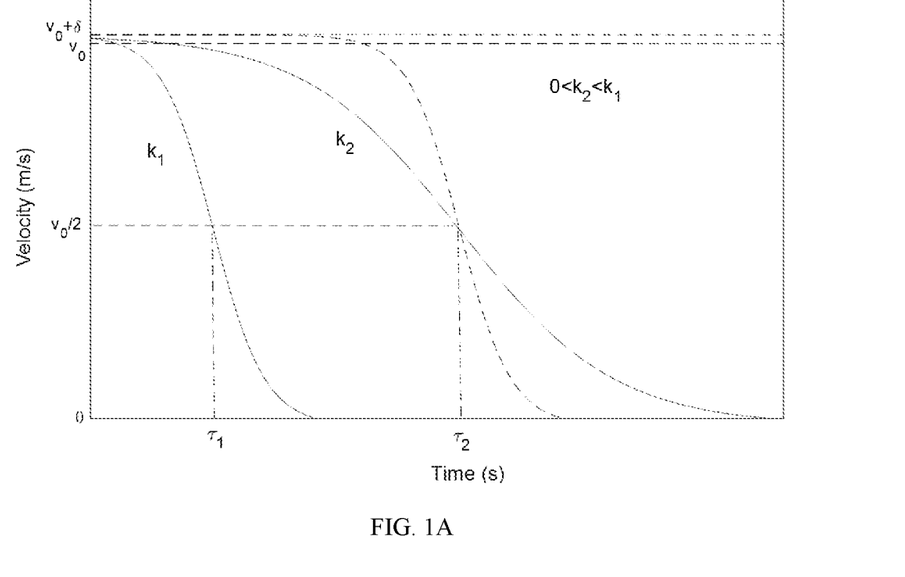
FIG. 1A shows several velocity-time curves of a vehicle braking from an initial velocity $v_0$ until it stops completely, which can be described by a preset vehicle deceleration (mathematical) model with three preset behavior adjustment parameters (see equation (2)), according to an embodiment of the present disclosure.
Figure 1B:
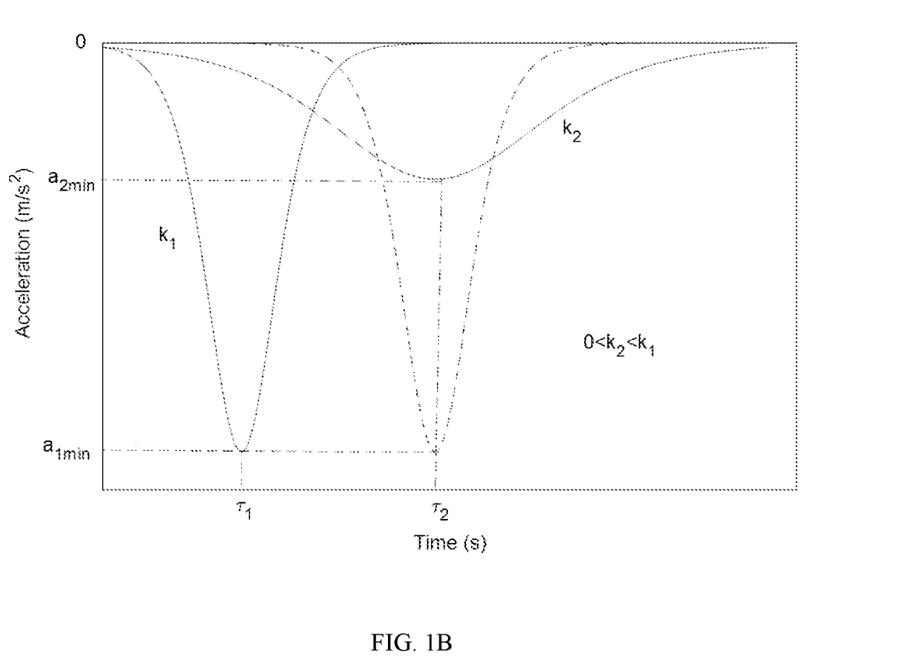
FIG. 1B shows several acceleration-time curves of a vehicle, which respectively correspond to the velocity-time curves shown in FIG. 1A according to the embodiment of the present disclosure.

When $k = k_1$, $k_2$ and $0 < k_2 < k_1$, a velocity-time curve and an acceleration-time curve are obtained as shown in FIG. 1, where the curve represented by the dotted line in FIG. 1 is obtained by translating a curve of $k = k_1$ along the time axis.

Clearly, when the second preset behavior adjustment parameter δ is given, there would be a significant difference in the braking time and distance of the vehicle (from the initial velocity $v_0$ to 0) if the first preset behavior adjustment parameter k is assigned with different values. The value of k largely determines the steepness of the curve, not only reflects the rapidity and smoothness of vehicular behavior adjustment, but also reflects a control strategy adopted by the vehicle according to the real control requirement at the present moment under a constraint of its own deceleration capacity, so that the deceleration process of the vehicle drove by any driver can be accurately described by the preset vehicle deceleration model.

b) If the vehicle brakes parking according to equation (2) and the initial velocity $v_0$ of the vehicle starting to brake parking is given, the acceleration function of the vehicle braking can be obtained by taking the time derivative of equation (2), as shown below:

$$a = \frac{dv(t)}{dt} = -k\left(\frac{v_0}{2} + \delta\right)(1 - \tanh^2(k(t-\tau))); \quad (6)$$

since $\tanh^2(k(t-\tau)) \leq 1$, the acceleration a has the largest absolute value when $t = \tau$. The largest absolute value of the acceleration a is expressed as follows:

$$\max(|a|) = k\left(\frac{v_0}{2} + \delta\right); \quad (7)$$

A jerk value (that is, the time derivative of acceleration) during a variable-speed operation of the vehicle is calculated as follows:

$$\frac{da}{dt} = 2k^2\left(\frac{v_0}{2} + \delta\right)\tanh^2(k(t-\tau))(1 - \tanh^2(k(t-\tau))); \quad (8)$$

and an second-order derivative of the acceleration is obtained:

$$\frac{d^2a}{dt^2} = 2k^3\left(\frac{v_0}{2} + \delta\right)(1 - \tanh^2(k(t-\tau)))(1 - 3\tanh^2(k(t-\tau))). \quad (9)$$

It can be known from equation (9) that, an extreme point of $$\frac{da}{dt}$$

occurs at $\tan h^2(k(t-\tau))=1$ or $\tan h^2(k(t-\tau))=\frac{1}{3}$, correspondingly the maximum absolute value of $$\frac{da}{dt}$$

can be obtained. Since $\tan h^2(k(t-\tau))=1$ when, and only when $t \to \pm\infty$, it does not satisfy the engineering requirements. Therefore, the maximum absolute value of $$\frac{da}{dt}$$

can be obtained only when $\tan h^2(k(t-\tau))=\frac{1}{3}$.

When $\tan h^2(k(t-\tau))=\frac{1}{3}$, the following equation is obtained:

$$\frac{da}{dt} = \frac{4}{9}k^2\left(\frac{v_0}{2} + \delta\right); \quad (10)$$

and equation (11) is further obtained:

$$\max\left(\left|\frac{da}{dt}\right|\right) = \frac{4}{9}k^2\left(\frac{v_0}{2} + \delta\right). \quad (11)$$

A simultaneous equation model for calculating the first preset behavior adjustment parameter k and the second preset behavior adjustment parameter δ is established through combining equation (7) with equation (11), as shown in equation (1):

$$\begin{cases} \max(|a|) = k\left(\frac{v_0}{2} + \delta\right) \\ \max\left(\left|\frac{da}{dt}\right|\right) = \frac{4}{9}k^2\left(\frac{v_0}{2} + \delta\right) \end{cases}. \quad (1)$$

In the field of vehicle application, max(|a|) and $$\max\left(\left|\frac{da}{dt}\right|\right)$$

not only reflect the performance of the vehicle in speed change operation, but also can be used to evaluate the smoothness and rapidity of the behavior adjustment of the vehicle. If |a| and $$\left|\frac{da}{dt}\right|$$

of a controlled vehicle are assigned with the maximum values that satisfy the requirement of smoothness, the behavior adjustment process of the controlled vehicle would be also the fastest. In other words, reasonably determining the values of max(|a|) and $$\max\left(\left|\frac{da}{dt}\right|\right)$$

can have a vehicle controlled to adjust its behavior smoothly and rapidly. When the vehicle brakes in an emergency, in order to ensure safety firstly, max(|a|) and $$\max\left(\left|\frac{da}{dt}\right|\right)$$

can be assigned with the maximum values within the allowable range of vehicle performance, and the smoothness of vehicle operation is sacrificed to achieve the fastest parking of the vehicle.

Clearly, the values of max(|a|) and $$\max\left(\left|\frac{da}{dt}\right|\right)$$

can be determined according to different control requirements of the vehicle during the brake parking, and the values of the first preset behavior adjustment parameter k and the second preset behavior adjustment parameter δ can be obtained by using equation (1). Then, t=0 and the values of $v_0$, k and δ are plugged into equation (2) to calculate the value of the third preset behavior adjustment parameter τ.

(2) The current braking mode information of the following vehicle during its following operation is obtained in real time.

(3) The current velocity of the leading vehicle and the current velocity of the following vehicle are obtained in real time, respectively.

(4) The current dynamic safe following distance between the following vehicle and the leading vehicle is calculated in real time using the dynamic safe following distance model according to the current preset control requirement of the following vehicle, the current braking mode information of the following vehicle, and the current velocity of the leading vehicle and the following vehicle.

(5) The current dynamic safe following distance is compared with the current actual following distance by a controller during every sampling period, to determine whether it is required to adjust the current following behavior of the following vehicle.

If it is required to adjust the current following behavior of the following vehicle, the following vehicle would be controlled to adjust its behavior, so that the difference between the current actual following distance and the current dynamic safe following distance is gradually shortened until the current actual following distance equals to the current dynamic safe following distance at a certain future sampling period, thereby achieving the real-time tracking of the dynamic safe following distance.

Specifically, the behavior of the following vehicle is controlled as follows.

When the current dynamic safe following distance is greater than the current actual following distance, it indicates that at the present moment the higher following efficiency is achieved at the cost of greater safety risk, the following vehicle must reduce its velocity to expand the actual following distance for safety risk reduction. When the current dynamic safe following distance is less than the current actual following distance, it indicates that at the present moment the following vehicle should speed up to have the current actual following distance to be reduced under the premise of ensuring safe following operation, so that vehicle following efficiency can be improved. The above two behavior adjustment processes of the following vehicle both involve the smoothness and rapidity of vehicular variable-speed operation, and the actual following distance plays a key role in determining the smoothness and rapidity of the behavior adjustment of the following vehicle. When the current dynamic safe following distance is equal to the current actual following distance, it indicates that vehicular following operation is safe and efficient at the present moment; but at this moment if there exists velocity difference between the following vehicle and the leading vehicle, during the next sampling period the actual following distance would be not equal to the dynamic safe following distance; if no velocity difference exists between the following vehicle and the leading vehicle, the current following state would be maintained by the following vehicle under control because it belongs to a safe and efficient steady-following state until it is broken by the behavior change of the leading vehicle. The method for vehicle following control based on the real-time calculation of the dynamic safe following distance described in the present disclosure can provide a scientific and reasonable dynamic safe following distance at any time during vehicular following operation, which serves as an important indicator for evaluating the quality of vehicular following behavior, and is used as a constraint for the behavior control of the following vehicle and the adjustment of the actual following distance.

Therefore, the real time calculation of dynamic safe following distance not only provides a basis for safe and efficient following operation of the following vehicle, but also creates a good condition for the following vehicle to smoothly and rapidly adjust its behavior.

In an embodiment, the dynamic safe following distance between the following vehicle and the leading vehicle in step (4) is calculated by using the dynamic safe following distance model as follows:

$$S(v^f(t), v^p(t)) = g_f(v^f(t)) - c g_p(v^p(t)) + \Delta s \qquad (3);$$

where $S(v^f(t), v^p(t))$ is a function which can be used to calculate in real time the current dynamic safe following distance between the following vehicle and the leading vehicle; $v^f(t)$ is the current velocity of the following vehicle; $v^p(t)$ is the current velocity of the leading vehicle; $g_f(v^f(t))$ is the absolute braking distance model of the following vehicle when it starts to brake at an initial velocity $v^f(t)$; $g_p(v^p(t))$ is the absolute braking distance model of the leading vehicle when it starts to brake at an initial velocity $v^p(t)$; $\Delta s$ is a distance margin designed for eliminating calculation error to keep the following vehicle always in safe following state after considering the time delay of the following vehicle adjusting its behavior in response to the behavior change of the leading vehicle. c is a parameter of the braking mode information, c=0 indicates that the following vehicle adopts the absolute braking mode; c=1 indicates that the following vehicle adopts the relative braking mode.

In an embodiment, when the leading vehicle and the following vehicle are in a safe and efficient steady-following state, the behavior of the following vehicle is controlled by implementing the method described in the present disclosure to track the dynamic safe following distance in real time. The control process is specifically described as follows.

1) According to the dynamic safe following distance model shown in equation (3), an equation for calculating the acceleration $a^f$ of the following vehicle in a neighborhood of the safe and efficient steady-following state is established as follows:

$$a^f = \frac{1}{\frac{d(g_f(v^f))}{dv^f}} \left( v^p - v^f + c \frac{d(g_p(v^p))}{dv^p} a^p \right); \qquad (12)$$

where c is a parameter of the braking mode information; $v^p$ is the current velocity of the leading vehicle; $v^f$ the current velocity of the following vehicle; $g_f(v^f)$ is the absolute braking distance model of the following vehicle when it starts to brake at the initial velocity $v^f$; $g_p(v^p)$ is the absolute braking distance model of the leading vehicle when it starts to brake at the initial velocity $v^p$; c=0 indicates that the following vehicle adopts the absolute braking mode; c=1 indicates that the following vehicle adopts the relative braking mode; $a^p$ is a current acceleration of the leading vehicle.

2) A force $F^f$ required for the velocity control of the following vehicle moving at an acceleration of $a^f$ is calculated as follows:

$$F^f = m^f a^f + W^f \qquad (13);$$

where $m^f$ is the mass of the following vehicle; $W^f$ is a natural resistance acted on the following vehicle during its following operation ($W^f > 0$, including an air resistance, a road surface resistance and a mechanical resistance inside the vehicle), which can be obtained using the Davis formula ($W^f = A + BV + CV^2$, where A, B and C are constant coefficients, and V is the velocity of the vehicle).

Obviously, if $a^f = 0$, $F^f = W^f$, where $F^f$ is a traction force applied to the following vehicle which overcomes the natural resistance $W^f$ to make the following vehicle run at a constant velocity; if $a^f > 0$, $F^f$ is a traction force to have the following vehicle accelerate forward; if $a^f < 0$, $F^f$ is a braking force to slow down the vehicle, where $F^f = 0$ is a special situation of $a^f < 0$, which indicates that the vehicle is slowed down completely relied on the natural resistance $W^f$.

When the leading vehicle and the following vehicle are in the neighborhood of the safe and efficient steady-following state, the following vehicle can maintain the current safe and efficient steady-following state, or recover the previous safe and efficient steady-following state, or enter a new safe and efficient steady-following state from the previous safe and efficient steady-following state. The vehicle behavior is controlled through the following steps.

3) If the following vehicle adopts the absolute braking mode, c=0; If the following vehicle adopts the relative braking mode, c=1.

4) The acceleration $a^f$ required for the behavior adjustment of the following vehicle in the current sampling period is calculated by plugging the value of c determined in step 3) into equation (12).

5) The force $F^f$ that the following vehicle should apply to drive the execution structure is calculated by plugging the acceleration $a^f$ calculated in step 4) into equation (13), enabling the following vehicle to adjust its velocity at the acceleration $a^f$.

6) When the current sampling period ends and a next sampling period is entered, that is, a new current sampling period starts, the process is returned to step 3).

Figure 2:
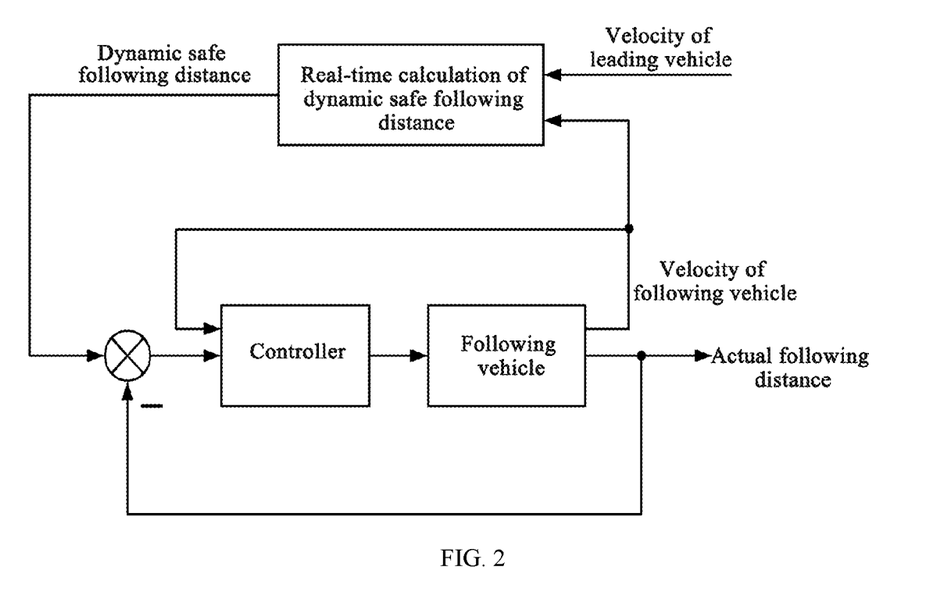
FIG. 2 is a schematic diagram showing vehicle-following control based on the real-time calculation of dynamic safe following distance according to an embodiment of the present disclosure.

As shown in FIG. 2, in an embodiment, the following vehicle can obtain the position, velocity and the acceleration of the leading vehicle in real time, so the current safe following distance between the following vehicle and the leading vehicle can be calculated according to equation (3) and compared with the actual following distance to determine whether it is required to adjust the current following behavior of the following vehicle. If it is required to adjust the current following behavior, the following vehicle would adjust its behavior until the current actual following distance equals to the current dynamic safe following distance at a certain future sampling period.

In an embodiment, in the case that only the position of the leading vehicle is available, the following vehicle adjusts its behavior using a first method.

In the first method, the following vehicle calculates the velocity of the leading vehicle in real time by using the dynamic positions of the leading vehicle. If the position of the leading vehicle changes with time, the following vehicle can adopt the relative braking mode (c=1), or the absolute braking mode (c=0). If the position of the leading vehicle does not change with time, it is indicated that the leading vehicle is parked, so the following vehicle must adopt the absolute braking mode, that is, c=0. After obtaining the braking mode information, the following vehicle calculates the dynamic safe following distance between the following vehicle and the leading vehicle according to the dynamic safe following distance model as shown in equation (3), and then compares the calculated safe following distance with the actual following distance to determine whether to adjust the current following behavior of the following vehicle. If yes, the distance between the following vehicle and the leading vehicle is adjusted to the safe following distance by controlling the behavior of the following vehicle.

In an embodiment, the safety and efficiency of the following behavior of the following vehicle is evaluated by comparing the current dynamic safe following distance with the current actual following distance, and at the same time, the current velocity and the current control strategy of the leading vehicle are taken into consideration to determine the behavior adjustment process of the following vehicle which can satisfy the safety, smoothness and rapidity requirements under the current velocity. If the leading vehicle and the following vehicle are in the neighborhood of the safe and efficient steady-following state, the control strategy and the control method adopted by the following vehicle have been described above, as shown in the steps of the control process that "when the leading vehicle and the following vehicle are in a safe and efficient steady-following state, the behavior of the following vehicle is controlled by implementing the method described in the present disclosure to track the dynamic safe following distance in real time".

In an embodiment, if the position of the leading vehicle is unavailable, a second method can be adopted to adjust the behavior of the following vehicle.

In the second method, if the position of the leading vehicle cannot be obtained, the following vehicle should immediately calculate the actual following distance based on the position of the leading vehicle obtained in the last sampling period. If the actual following distance is greater than or equal to the current dynamic safe following distance in the absolute braking mode, the following vehicle can adjust its behavior in safety, smoothness, and efficiency, so that the actual following distance between the following vehicle and the leading vehicle at a certain future sampling period is adjusted to the dynamic safe following distance. If the actual following distance is less than the dynamic safe following distance, the emergency braking should be performed immediately to ensure safety.

In comparison with the vehicle following control based on the traditional methods of establishing a fitting function, the method for vehicle following control based on the real-time calculation of dynamic safe following distance in the present disclosure has the following advantages.

The preset vehicle deceleration model as shown in equation (2) can reflect the smoothness and rapidity of a vehicle in the brake parking under different control. Specifically, the fitting function of the absolute braking distance of the vehicle versus its braking initial velocity is established on the preset vehicle deceleration model, and used as the basis to determine the dynamic safe following distance, so that the control requirements for the following vehicle to stop safely, smoothly and rapidly can be fully considered in determining the dynamic safe following distance model.

The curve fitting function is completely established on the preset vehicle deceleration model shown in equation (2) that reflects the smoothness and rapidity of a vehicle during its braking. Compared with the modelling methods of dynamic safe following distance model completely based on engineering experimental data, the method for calculating the dynamic safe following distance between the following vehicle and the leading vehicle described in the present disclosure can avoid excessive engineering experiments, reduce the engineering cost, and improve the accuracy of the curve fitting function and the efficiency of establishing the dynamical safe following distance model.

The braking mode information of the following vehicle at the present moment is considered by the dynamic safe following distance model, which thereby provides an extensive suitability in calculating in real time the current safe following distance between the leading vehicle and the following vehicle for vehicle following control under complex following situations.

When the method for vehicle following control described in the present disclosure is implemented, the following vehicle can control its behavior to track the dynamic safe following distance in real time, thereby integrating the safety, rapidity and smoothness requirements of vehicle following behavior adjustments into the real-time control of the dynamic safe following distance.

The method mentioned above for calculating the dynamic safe following distance in real time is scientific and efficient, and thus the method for vehicle following control based on the real-time calculation of the dynamic safe following distance provided in the present disclosure is more suitable to be used as a standard for vehicle manufacturing, traffic administration and autonomous driving.

What is claimed is:

1. A method for vehicle following control based on real-time calculation of dynamic safe following distance, comprising:
(1) establishing a dynamic safe following distance model for vehicle following control; wherein the dynamic safe following distance model is established through steps of:
(1.1) according to a preset control requirement of a vehicle braking from an initial velocity until it stops completely, obtaining a first preset behavior adjustment parameter and a second preset behavior adjustment parameter according to equation (1):

$$\begin{cases} \max(|a|) = k\left(\frac{v_0}{2} + \delta\right) \\ \max\left(\left|\frac{da}{dt}\right|\right) = \frac{4}{9}k^2\left(\frac{v_0}{2} + \delta\right) \end{cases} \quad (1)$$

wherein $v_0$ is an initial velocity when the vehicle starts to brake and decelerate; k is the first preset behavior adjustment parameter; $\delta$ is the second preset behavior adjustment parameter; a is an acceleration of the vehicle; max( ) is a function that returns a maximum value; and max(|a|) and $$\max\left(\left|\frac{da}{dt}\right|\right)$$

reflect control requirements for the vehicle to brake smoothly and rapidly;
(1.2) calculating a third preset behavior adjustment parameter by substituting values of the first preset behavior adjustment parameter and the second preset behavior adjustment parameter into a preset vehicle deceleration model; the preset vehicle deceleration model is expressed by equation (2):

$$v(t) = -\left(\frac{v_0}{2} + \delta\right)\tanh(k(t-\tau)) + \frac{v_0}{2}; \quad (2)$$

wherein t is a time variable; v(t) is a time-variable velocity function and $v(t)|_{t=-\infty}=v_0+\delta$, $v(t)|_{t=\infty}=-\delta$; tan h( ) is a hyperbolic tangent function; and $\tau$ is the third preset behavior adjustment parameter;
(1.3) calculating and determining an absolute braking distance of the vehicle travelling from the time it starts to brake at the initial velocity $v_0$ to another time it stops completely by substituting the values of the above three preset parameters k, $\delta$, and $\tau$ into equation (2) and performing the time integration of equation (2);
(1.4) obtaining a plurality of absolute braking distances respectively corresponding to different values of the initial velocity $v_0$ by respectively performing the above steps from (1.1) to (1.3); and establishing a curve fitting function of the absolute braking distance changing with the initial velocity by using a numerical analysis method; the curve fitting function established above is the absolute braking distance model of the vehicle;
(1.5) obtaining an absolute braking distance model of a leading vehicle and an absolute braking distance model of the following vehicle by performing the above steps from (1.1) to (1.4) according to the different preset control requirements of the leading vehicle and the following vehicle; then further establishing the dynamic safe following distance model for vehicle following control;
(2) obtaining a current braking mode information of the following vehicle during its following operation;
(3) obtaining a current velocity of the leading vehicle and a current velocity of the following vehicle in real time; calculating a current dynamic safe following distance at the present moment between the following vehicle and the leading vehicle using the dynamic safe following distance model for the following vehicle according to a current preset control requirement of the following vehicle, the current braking mode information of the following vehicle, the current velocity of the leading vehicle and the current velocity of the following vehicle; and
(4) comparing, by a controller, the current dynamic safe following distance with a current actual following distance to determine whether it is required to adjust a current following behavior of the following vehicle according to an actual control requirement;
if it is required to adjust the current following behavior of the following vehicle, controlling the following vehicle to adjust its behavior until the actual following distance equals to the dynamic safe following distance during a certain future sampling period, thereby achieving the real-time tracking of the dynamic safe following distance; otherwise, maintaining the current actual following distance by the following vehicle under control, which can only happen in the safe and efficient stead-following state under which no velocity difference exists between the leading vehicle and the following vehicle, and the current dynamic safe following distance is equal to the current actual following distance.

2. The method of claim 1, wherein in step (3), the dynamic safe following distance model established in step (1.5) is used to calculate in real time the current dynamic safe following distance between the following vehicle and the leading vehicle; the dynamic safe following distance model is described as follows:

$$S(v^f(t), v^p(t)) = g_f(v^f(t)) - cg_p(v^p(t)) + \Delta s \quad (3);$$

wherein $S(v^f(t), v^p(t))$ is a function which can be used to calculate in real time the current safe following distance between the following vehicle and the leading vehicle under the current preset control requirement; $v^f(t)$ is the current velocity of the following vehicle; $v^p(t)$ is the current velocity of the leading vehicle; $g_f(v^f(t))$ is an absolute braking distance model of the following vehicle when it starts to brake at an initial velocity $v^f(t)$; $g_p(v^p(t))$ is an absolute braking distance model of the leading vehicle when it starts to brake at an initial velocity $v^p(t)$; $\Delta s$ is a distance margin designed for eliminating calculation error to keep the following vehicle always in a safe following state after considering the time delay of the following vehicle adjusting its behavior in response to the behavior change of the leading vehicle; c is a parameter of the braking mode information, wherein c=0 indicates that the following vehicle adopts the absolute braking mode; c=1 indicates that the following vehicle adopts the relative braking mode.

3. The method of claim 1, wherein in step (1.3), the absolute braking distance of the vehicle travelling from the time it starts to brake at the initial velocity $v_0$ to another time it stops completely is obtained through equation (4):

$$S_B = \int_0^{2\tau} v(t)dt \qquad (4);$$

wherein $S_B$ is an absolute braking distance when the vehicle starts to brake at the initial velocity $v_0$; $v(t)$ is the time-variable velocity function; and $\tau$ is the third preset behavior adjustment parameter;

in step (1.4), the curve fitting function is established by using the numerical analysis method to reflect a mapping relationship between values of absolute braking distances $S_B$ and different initial velocity $v_0$; the curve fitting function established above is the absolute braking distance model of the vehicle, which is further used to construct the dynamic safe following distance model.

4. A vehicular electronic system, comprising:

two on-board speed sensors respectively installed on a leading vehicle and a following vehicle;

two vehicle positioning devices respectively installed on the leading vehicle and the following vehicle;

two wireless communication devices respectively installed on the leading vehicle and the following vehicle;

one inter-vehicle distance measuring instrument installed on the following vehicle;

at least one processor and a memory connected to the at least one processor, both installed on the following vehicle;

wherein at least one external instruction is received by the vehicular electronic system after initialization and executed by the at least one processor to perform the method of claim 1.

5. A non-transitory computer-readable storage medium having stored thereon at least one program, wherein the at least one program is called by at least one processor through executing at least one external instruction, to perform the method of claim 1.

* * * * *